United States Patent [19]

Savoca et al.

[11] Patent Number: 5,238,894
[45] Date of Patent: Aug. 24, 1993

[54] HYDROXYL GROUP-CONTAINING AMINE-BORON ADDUCTS AS REDUCED ODOR CATALYST COMPOSITIONS FOR THE PRODUCTION OF POLYURETHANES

[75] Inventors: Ann C. L. Savoca, Sinking Springs; Michael Louie, Bethlehem; Mark L. Listemann, Whitehall, all of Pa.

[73] Assignee: Air Products and Chemcials, Inc., Allentown, Pa.

[21] Appl. No.: 896,274

[22] Filed: Jun. 10, 1992

Related U.S. Application Data

[60] Division of Ser. No. 839,519, Feb. 20, 1992, Pat. No. 5,166,223, which is a continuation-in-part of Ser. No. 829,786, Jan. 31, 1992, Pat. No. 5,162,379, which is a continuation-in-part of Ser. No. 763,107, Sep. 20, 1991, Pat. No. 5,086,081.

[51] Int. Cl.$^5$ ............................................. B01J 31/02
[52] U.S. Cl. ................................. 502/167; 502/150
[58] Field of Search ........................... 502/150, 167

[56] References Cited

U.S. PATENT DOCUMENTS

| | | | |
|---|---|---|---|
| 3,127,404 | 3/1964 | Mascioli | 260/268 |
| 3,193,515 | 7/1965 | Mascioli | 260/2.5 |
| 4,006,124 | 2/1977 | Welte et al. | 260/77.5 |
| 4,026,840 | 5/1977 | Bechara et al. | 260/2.5 |
| 4,425,444 | 1/1984 | White | 521/105 |
| 4,452,921 | 6/1984 | Horacer et al. | 502/167 X |
| 4,530,938 | 7/1985 | White | 521/105 |
| 4,611,013 | 9/1986 | Ashida | 521/105 |
| 4,857,560 | 8/1989 | Schmidt et al. | 521/105 |
| 5,143,884 | 9/1992 | Skoultchi et al. | 502/167 X |

FOREIGN PATENT DOCUMENTS 2301554 9/1976 France.

OTHER PUBLICATIONS

"Int. Prog. Urethanes 1980", 2. 153-73 Unconventional Blowing Agents for Polyurethane Foams (no month available).

"J. Org. Chem." 1972 37(14), 2232 A Search for the Addition of Moderate Nucleophiles to Boric and Benzeneboronic Acids in Water (no Month available).

Chem Abstract 99:39229a "Effect of fillers on the Foaming Parameters of Polyurethane Foams", 1983 (no month available).

*Primary Examiner*—Patrick P. Garvin
*Attorney, Agent, or Firm*—Michael Leach; James C. Simmons; William F. Marsh

[57] ABSTRACT

An amine-boron composition for catalyzing the urethane reaction, particularly in preparing a polyurethane foam, consisting essentially of the addition product of a tertiary amine and a boron compound of the formula $$R_nB(OH)_{3-n}$$

where
n=0 or 1, and
R=$C_1$–$C_8$ alkyl, $C_5$–$C_8$ cycloalkyl or $C_6$–$C_{10}$ aryl.

Preferred catalysts are prepared by mixing triethylenediamine or 3-quinuclidinol with boric acid.

8 Claims, No Drawings

HYDROXYL GROUP-CONTAINING AMINE-BORON ADDUCTS AS REDUCED ODOR CATALYST COMPOSITIONS FOR THE PRODUCTION OF POLYURETHANES

The present application is a division of application Ser. No. 839,519, filed on Feb. 20, 1992 and now U.S. Pat. No. 5,166,223, which is a continuation-in-part of Ser. No. 829,786, filed on Jan. 31, 1992 and now U.S. Pat. No. 5,162,379, which is a continuation-in-part of Ser. No. 763,107, filed on Sep. 20, 1991 and now U.S. Pat. No. 5,086,081.

FIELD OF THE INVENTION

The present invention relates to the use of tertiary amines as catalysts for producing polyurethanes.

BACKGROUND OF THE INVENTION

The commercial production of polyurethanes via isocyanate polyaddition reactions requires the use of catalysts. Tertiary amines were widely accepted in the industry as versatile polyurethane catalysts. They are generally stable in the presence of standard polyurethane formulation components and can impact both the blowing (water-isocyanate) and gelling (polyol-isocyanate) reactions. Unfortunately, a number of commonly used tertiary amine catalysts are relatively volatile and have an unpleasant smell. Even at low use levels, they may impart a noticeably pungent odor to the polyurethane formulation. It would be desirable to identify alternatives to standard tertiary amine catalysts which are not malodorous, yet exhibit the same type of activity in isocyanate polyaddition reactions.

One strategy for the reduction of odor associated with tertiary amine catalysts is the identification of less volatile structures. The literature teaches numerous techniques for reducing volatility, particularly increasing molecular weight or improving hydrogen bonding capability.

U.S. Pat. No. 4,026,840 describes the use of hydroxyfunctional tertiary amines as polyurethane catalysts, particularly useful for the production of polyisocyanurate. In addition to lower volatility, such materials also contain reactive functionality which binds the amine into the final product. Typically, however, catalysts which are non-fugitive by way of reaction with isocyanate must be used at relatively high levels to compensate for immobilization of the tertiary amine functionality during urethane part production.

U.S. Pat. No. 4,006,124 which is an example of lower volatility being achieved by metal complex formation, describes the use of amidine-metal complexes as polyurethane catalysts.

U.S. Pat. No. 4,857,560 mentions reduced odor emission as an additional advantage of the disclosed expansion catalysts formed from tertiary amines and an acid mixture of (1) boric acid and (2) a carboxylic acid. Unfortunately, strong organic acid containing catalysts tend to show masterbatch instability and corrosivity. Furthermore, carboxylic acid functionality is reactive with and can consume expensive isocyanate functionality, resulting in the formation of amide rather than the more standard urethane or urea segments in a resulting part.

Boric acid derivatives have not otherwise been used in combination with tertiary amines to effect amine odor reduction. Other uses of boric acid in polyurethane formulations, however, have been described.

CA 99(6):39229a notes that boric acid, when used as a filler at 10–40%, decelerates foaming in polyurethanes based on Laprol 805 and Lapramol 294 polyether polyols, polyisocyanate, Freon 113 and water.

"Int. Prog. Urethanes 1980", 2, 153–73 describes the use of boric acid as a blowing agent, its behavior being almost equal to that of water. Neither reference describes the effect of boric acid at use levels typified by a catalyst, nor do they indicate the effect of boric acid on polyurethane catalysis in the presence of a tertiary amine.

U.S. Pat. No. 4,611,013 describes the use of quarternary ammonium borates to effect the concurrent trimerization/carbodiimidization of polyisocyanates. The borates are prepared from boric acid, alcohols and quarternary ammonium hydroxides and as such are not derived from tertiary amines. Other examples are given by U.S. Pat. Nos. 4,530,938 and 4,425,444.

U.S. Pat. No. 3,193,515; U.S. Pat. No. 3,127,404 and FR 2,301,554 disclose the use of boric acid in the preparation of an ammonium salt polyurethane catalyst from triethylenediamine and a glycol borate acid. Glycol borate acids are prepared by heating mixtures containing not substantially less than 0.5 moles of boric acid per mole glycerol or alternative vicinal glycol to effect acid complex formation. The advantage of such catalyst composition is delayed activity and/or accelerated cure. Unfortunately, the preferred catalyst compositions are highly viscous because a low glycol/boric acid ratio is required to minimize the amount of glycol delivered into a formulation. The addition of low molecular weight glycol into polyurethane parts, particularly foam parts, is typically avoided to prevent unnecessary consumption of expensive isocyanate. Further, glycols can negatively impact physical properties.

"J. Org. Chem." 1972, 37 (14), 2232 discloses that monodentate nitrogen nucleophiles do not react significantly with boric acid in aqueous solution.

SUMMARY OF THE INVENTION

The present invention provides a composition for catalyzing the trimerization of an isocyanate and/or the reaction between an isocyanate and a compound containing a reactive hydrogen, e.g. the urethane reaction for making polyurethane. The catalyst composition consists essentially of a tertiary amine urethane catalyst in combination with a boron compound of the formula

where
n=0 or 1, and
R=$C_1$-$C_1$-$C_8$alkyl, $C_5$-$C_8$cycloalkyl or $C_6$-$C_{10}$aryl.
The tertiary amine may contain reactive functionality, such as hydroxyl groups.

As an advantage of these catalyst compositions there is a significant reduction in amine odor compared to standard polyurethane catalyst compositions containing volatile tertiary amines. The odor reduction is attributed to a reduced vapor pressure for the tertiary amine in the presence of the boron compound and suggests that the use of these new amine-boron compositions will help to minimize worker exposure to amine catalysts during polyurethane foam production. This is an important advantage since tertiary amines can have adverse health effects. One example of an adverse health effect is the temporary condition termed "halo vision" which has been reported in connection with worker exposure to bis(dimethylaminoethyl) ether, an industry standard catalyst for the reaction of water with an isocyanate. Other symptoms of exposure to amine catalysts are lacrimation, conjunctivitis, nausea and respiratory irritation.

Improved reactivities and physical properties have been noted when such amine-boron compositions are used as catalysts for isocyanate polyaddition reactions.

In catalyst compositions containing reactive (e.g. hydroxyl groups) tertiary amines and a boron compound, an additional advantage is that desired catalyst performance is achieved at lower amine use level.

Other distinct advantages over boron-containing prior art catalyst compositions include reduced viscosity and lower corrosivity.

DETAILED DESCRIPTION OF THE INVENTION

The catalyst compositions according to the invention can catalyze the reaction between an isocyanate functionality and an active hydrogen-containing compound, i.e. an alcohol, an amine or water, especially the urethane (gelling) reaction to make polyurethanes and the blowing reaction of water with isocyanate to release carbon dioxide for making foamed polyurethanes, or the trimerization of the isocyanate functionality to form polyisocyanurates.

The polyurethane products are prepared using suitable organic polyisocyanates well known in the art including, for example, hexamethylene diisocyanate, phenylene diisocyanate, toluene diisocyanate ("TDI") and 4,4'-diphenylmethane diisocyanate. Especially suitable are the 2,4- and 2,6-TDIs individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of polyisocyanates and polyether or polyester polyols.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and tri-functional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as reacting caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol on which vinyl monomers are graft copolymerized. Styrene and acrylonitrile are the usual monomers of choice. The second type, polyurea modified polyols, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Other typical agents found in the polyurethane foam formulations include crosslinkers such as ethylene glycol, butanediol, diethanolamine, diisopropanolamine, triethanolamine and/or tripropanolamine; blowing agents such as water, methylene chloride, trichlorofluoromethane and the like; and cell stabilizers such as silicones.

A general polyurethane flexible foam formulation containing the catalyst composition according to the invention would comprise the following components in parts by weight (pbw):

| Flexible Foam Formulation | |
|---|---|
| | Parts by Weight |
| Polyol | 20–80 |
| Polymer Polyol | 80–20 |
| Silicone Surfactant | 1–2.5 |
| Blowing Agent | 2–4.5 |
| Crosslinker | 0.5–2 |
| Catalyst | 0.5–2 |
| Isocyanate Index | 50–115 |

The urethane catalyst composition consists essentially of the addition product, or adduct, of a tertiary amine urethane catalyst, which can contain reactive functionality, e.g. hydroxyl groups, and a boron compound of the general formula:

$R_nB(OH)_{3-n}$ where
n is 0 or 1, and
R is $C_1$–$C_8$ alkyl, $C_5$–$C_8$ cycloalkyl or $C_6$–$C_{10}$ aryl.

Alkyl groups in the boron compound would include, for example, methyl, ethyl, butyl, ethylhexyl and the like; cycloalkyl would include, for example, cyclopentyl, cyclohexyl and the like; and aryl groups would include, for example, phenyl, p-tolyl and the like.

Exemplary of suitable boron compounds are boric acid, phenylboronic acid and isopropylboronic acid. The preferred boron compound is boric acid where n is 0. Contemplated as functional equivalents to boric acid for purposes of this invention are the borate esters, i.e., alkyl-, dialkyl- and trialkylborates, in which the alkoxy groups hydrolyze to the hydroxyl functionality in the presence of water.

It is also contemplated that any tertiary amine suitable as a urethane catalyst can be used in making the amine-boron adduct catalyst composition. Illustrative of suitable tertiary amine urethane catalysts are pentamethyldiethylenetriamine, pentamethyldipropylene-triamine, bis(dimethylaminoethyl) ether, dimethylcyclohexylamine, triethylenediamine ("TEDA"), 4-dimethylaminopyridine, diazabicyclo[5.4.0]undec-7-ene, diaz cyclo[4.3.0]non-5-ene, N-ethylmorpholine, N-methylmorpholine, N-cetyl-N,N-dimethylamine, N-cocomorpholine, N-(N,N-dimethylaminoethyl)morpholine, tris(3-dimethylamino-propyl)amine and the like.

The suitable tertiary amine urethane catalyst may also contain hydroxy functionality. Illustrative of tertiary amines containing reactive functionality are N,N,N'-trimethyl-N'-hydroxyethylethylenediamine, N,N-dimethylethanolamine, N,N,N'-L-trimethyl-N'-hydroxyethylbis(aminoethyl)ether, 3-quinuclidinol (also known as 3-hydroxyazabicyclo[2.2.2]octane) and the like. The preferred 3-quinuclidinol has the following formula I:

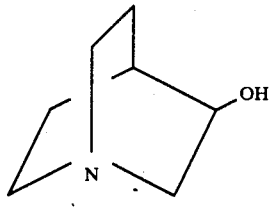

Typical molar ratios of tertiary nitrogen to boron in making the catalyst composition are from 1:0.01 to 1:100, preferably 1:0.1 to 1:10, most preferably 1:0.5 to 1:2 for acyclic amines, 1:0.5 to 1:1 for TEDA and 1:0.5 to 1:1 for 3-quinuclidinol.

Such catalyst compositions are generally easily handled solids which are prepared by precipitation from appropriate solvents upon mixing the tertiary amine with the boron compound at temperatures from ambient (or lower) to about 50° C., i.e. without substantial heating, and any convenient pressure, especially atmospheric pressure. In addition, solid adducts are afforded upon mixing the tertiary amine and the boric acid in a on-solvent for the adduct, again without the need for substantial heating. For example, TEDA and boric acid can be lended in tetrahydrofuran or 2-(2-methoxyethoxy)ethanol to yield a solid product.

The amine-boron adducts are also easily prepared and more conveniently delivered as solutions in carriers such as water, alcohols, polyols, amines, polyamines, ethers, hydrocarbons and chlorinated hydrocarbons. The preferred carriers are water, alcohols and polyols. The more preferred carriers are standard polyurethane additives such as water, crosslinkers (e.g., diethanolamine), chain extenders (e.g., butanediol), and higher molecular weight polyether and polyester polyols. When using phenylboronic acid, it is preferred first to dissolve the tertiary amine in the carrier and then add the phenylboronic acid.

A catalytically effective amount of the catalyst composition is used in the polyurethane formulation. More specifically, suitable amounts of the catalyst composition may range from about 0.01 to 10 parts per 100 parts polyol in the polyurethane formulation.

The catalyst compositions may be used in combination with other tertiary amine and organotin urethane catalysts well known in the urethane art.

These catalyst compositions have the advantage of substantially reduced amine odor relative to standard tertiary amines while exhibiting comparable or improved catalytic activity. Significantly improved catalytic activity has been noted for reactive amine-boron combinations. The catalyst composition also manifests reduced viscosity and lower corrosivity.

The following automotive formulation master batches were used in the Examples:

| Automotive Formulation Master Batch I | |
|---|---|
| PLURACOL 816 (conventional polyether polyol) | 40 pphp |
| PLURACOL 1003 (styrene-acrylonitrile filled polymer polyol) | 60 |
| DC 5243 (silicone surfactant) | 1.2 |
| DEOA-LF (85 wt % diethanolamine in water) | 1.75 |
| Automotive Formulation Master Batch II | |
| Multranol 9143 (conventional polyether polyol) | 50 pphp |
| Multranol 9151 (PHD filled polymer polyol) | 50 |
| DC 5043 (silicone surfactant) | 1.75 |
| DEOA-LF | 2.0 |
| Automotive Formulation Master Batch III | |
| Pluracol 816 | 60 pphp |
| Pluracol 973 (styrene-acrylonitrile filled polyether polyol) | 40 |
| DC 5043 | 1.5 |
| DEOA-LF | 1.76 |

EXAMPLE 1

A 1:2 molar mixture of BL22 catalyst (a 70:30 wt/wt mixture of pentamethyldiethylenetriamine and pentamethyldipropylene-triamine) and boric acid was prepared according to the following procedure. BL22 catalyst (25 g), boric acid (17 g), and water (42 g) were combined and dissolved at room temperature over 30 min. The resulting solution had minimal, if any, amine odor.

EXAMPLE 2

A 1:3 molar mixture of BL22 catalyst and boric acid was prepared according to the following procedure. BL22 catalyst 25 g), boric acid (26 g), and water (51 g) were combined and dissolved at room temperature over 30 min. The resulting solution had minimal, if any, amine odor.

EXAMPLE 3

A 1:2 molar mixture of triethylenediamine ("TED") and phenylboronic acid was prepared by cOmbining TEDA (1.25 g), phenylboronic acid (2.75 g), ethylene glycol (6.2 g) and diethylene glycol (9.8 g) and dissolving with mild heating (~40° C.) over several minutes. The resulting solution had minimal, if any, amine odor.

EXAMPLE 4

A 1:2 molar mixture of TEDA and boric acid was prepared by combining TEDA (118.5 g), boric acid (131.1 g) and water (250 g) and dissolving at room temperature over 30 min.

EXAMPLE 5

A 1:2 molar mixture of pentamethyldiethylenetriamine (Polycat ®5) and boric acid was prepared by combining pentamethyldiethylenetriamine (260 g), boric acid (186.4 g) and water (446.4 g) and dissolving at room temperature over 30 min. The resulting solution had minimal, if any, amine odor.

EXAMPLE 6

A 1:2 molar mixture of pentamethyldipropylenetriamine (Polycat 77) and boric acid was prepared by combining pentamethyldipropylenetriamine (292.5 g), boric acid (180.4 g) and water (472.9 g) and dissolving at room temperature over 30 min. The resulting solution had minimal, if any, amine odor.

EXAMPLE 7

A 1:2 molar mixture of bis(dimethylaminoethyl)ether (DABCO BL-19) and boric acid was prepared by combining bis(dimethylaminoethyl)ether (50 g), boric acid (38.8 g) and water (88.8 g) and dissolving at room temperature over 30 min. The resulting solution had minimal, if any, amine odor.

The following Comparative Example 8 to Example 24 demonstrate that these reduced odor amine-boron compositions exhibit equivalent or improved reactivity when compared to standard tertiary amine catalysts for the production of flexible molded polyurethane foam. Foams prepared using the new catalyst compositions have physical properties which compare well to those for foams prepared using industry standard catalysts.

COMPARATIVE EXAMPLE 8 AND EXAMPLE 9

PHD polyol based formulations were prepared from master batch formulation II in which the DEOA-LF level was 1.75 pphp, 2.8 pphp water and (a) 0.50 pphp DABCO 33LV ® catalyst with 0.12 pphp DABCO ® BL-11 catalyst as the Comparative Example 8 control catalyst or (b) 1.2 pphp of a 50 wt % aqueous solution of 1:2 TEDA and boric acid (TEDA:BA) of the Example 4 catalyst. Foams were prepared on an Elastogram PU-20 machine by combining each of the above formulations with an 80:20 mixture of 2,4- and 2,6-TDI at a 1.05 molar ratio of isocyanate to active hydrogen functionality in a 140° F. (60° C.) mold for 4 min. Catalyst performance and physical properties are given in Table A.

TABLE A

| Catalyst | DABCO 33LV/BL-11 | TEDA:BA |
|---|---|---|
| Initiation time$^a$ (sec) | 5.83$^b$ | 5.80$^c$ |
| Extrustion time (sec) | 31.04$^b$ | 30.91$^c$ |
| String Gel time (sec) | 42.64$^b$ | 39.85$^c$ |
| Extrusion weight (g) | 41$^b$ | 16.9$^c$ |
| Pad weight (g) | 628.4$^b$ | 606.6$^c$ |
| ILD-25% | | 34.8$^c$ | 35.0$^c$ |
| ILD-65% | 110.0$^c$ | 105.8$^c$ |
| ILD-25% R | 28.0$^c$ | 28.3$^c$ |
| Density (lb/ft$^3$) | 2.07$^c$ | 2.09$^c$ |
| Airflow (ft$^3$/min) | 1.36$^c$ | 1.50$^c$ |
| Tear (psi) | 1.47$^c$ | 1.53$^c$ |
| Tensile (psi) | 16.95$^c$ | 19.21$^c$ |
| Strain (%) | 76.98$^c$ | 90.71$^c$ |
| Ball Rebound (in) | 45.00$^c$ | 49.50$^c$ |
| Compression set 50% | 7.96$^c$ | 8.07$^c$ |

$^a$cream time
$^b$average of three shot sizes-4.00, 3.85 and 3.60 sec
$^c$average for foams poured at minimum fill (3.60 sec shot)

COMPARATIVE EXAMPLES 10-11 AND EXAMPLES 12-14

SAN polyol based formulations were prepared from master batch formulation III, 3.5 pphp total water, and a) 0.50 pphp DABCO 33-LV catalyst with 0.15 pphp DABCO BL-11 catalyst as the Comparative Example 10 control catalyst, b) 0.50 pphp DABCO 33-LV catalyst with 0.19 pphp DABCO BL-17 catalyst as Comparative Example 11 control catalyst, or c) 0.50 pphp DABCO 33-LV with varying levels of the catalysts prepared in Examples 5-7. The formulations were mixed well for 30 sec immediately prior to adding 43.3 pphp of an 80:20 mixture of 2,4- and 2,6-TDI (1.05 molar ratio of isocyanate to active hydrogen functionality). After mixing well for 4 sec, the foam was allowed to rise freely at room temperature. Full foam height was measured immediately and again after aging for 24h. Foam recession is the percent difference between the final foam height measurement and the initial foam height measurement. Catalyst use levels and performance data are given in Table B.

TABLE B

| | Comp Example 10 33-LV/BL-11 | Comp Example 11 33-LV/BL-17 | Example 12 33-LV/ Example 5 catalyst | Example 13 33-LV/ Example 6 catalyst | Example 14 33-LV/ Example 7 catalyst |
|---|---|---|---|---|---|
| Catalyst Comb | | | | | |
| DABCO 33-LV | 0.50 | 0.50 | 0.50 | 0.50 | 0.50 |
| DABCO BL-11 | 0.15 | | | | |
| DABCO BL-17 | | 0.19 | | | |
| Example 5 catalyst | | | 0.54 | | |
| Example 6 catalyst | | | | 1.01 | |
| Example 7 catalyst | | | | | 0.39 |
| top of cup 1 | 9.76 | 12.42 | 11.04 | 11.45 | 10.68 |
| top of cup 2 | 27.60 | 32.00 | 30.15 | 31.91 | 30.95 |
| string gel | 44.73 | 49.31 | 44.27 | 45.29 | 46.52 |
| full rise | 67.29 | 72.43 | 69.08 | 69.14 | 72.66 |
| % recession | 7.1 | | 7.0 | 8.3 | 7.0 |

COMPARATIVE EXAMPLE 15

The control catalysts, 0.35 pphp DABCO 33LV catalyst (containing 33 wt % TEDA and 67 wt % dipropylene glycol) and 0.24 pphp BL22 catalyst, and 2.9 pphp water (3.2 pphp total water) were added to automotive formulation master batch I and mixed well for 30 sec immediately prior to adding 41.6 pphp of an 80:20 mixture of 2,4- and 2,6-TDI (1.05 molar ratio of isocyanate to active hydrogen functionality). After mixing well for 4 sec, the foam was allowed to rise freely at room temperature. Full foam rise height was measured immediately and again after aging for 24h.

| | |
|---|---|
| top of cup 1 (sec) | 9.33 |
| top of cup 2 (sec) | 26.13 |
| string gel (sec) | 45.49 |
| full rise (sec) | 60.38 |
| initial full rise (mm) | 407.56 |
| final full rise (mm) | 367.52 |

EXAMPLE 16

An experimental catalyst, 0.81 pphp of a 50 wt % aqueous solution of 1:2 BL22 catalyst and boric acid prepared according to Example 1 (equivalent to 0.24 pphp BL22 catalyst), 0.35 pphp DABCO 33LV catalyst, and 2.5 pphp water (3.2 pphp total water) were added to master batch formulation I and mixed well for 30 sec immediately prior to adding 41.6 pphp of an 80:20 mixture of 2,4- and 2,6-TDI (1.05 molar ratio of isocyanate to active hydrogen functionality). After mixing well for an additional 4 sec, the foam was allowed to rise freely at room temperature. Full foam rise height was measured immediately and again after aging for 24h.

| | |
|---|---|
| top of cup 1 (sec) | 9.90 |
| top of cup 2 (sec) | 26.50 |
| string gel (sec) | 47.14 |
| full rise (sec) | 58.77 |
| initial full rise (mm) | 409.22 |
| final full rise (mm) | 347.25 |

EXAMPLE 17

An experimental catalyst, 0.98 pphp of a 50 wt % aqueous solution of 1:3 BL22 catalyst and boric acid prepared according to Example 2 (equivalent to 0.24 pphp BL22 catalyst), 0.35 pphp DABCO 33LV catalyst, and 2.4 pphp water (3.2 pphp total water) were added to master batch formulation I and mixed well for 30 sec immediately prior to adding 41.6 pphp of an 80:20 mixture of 2,4- and 2,6-TDI (1.05 molar ratio of isocyanate to active hydrogen functionality). After mixing well for 4 sec, the foam was allowed to rise freely at room temperature. Full foam rise height was measured immediately and again after aging for 24h.

| | |
|---|---|
| top of cup 1 (sec) | 10.73 |
| top of cup 2 (sec) | 28.27 |
| string gel (sec) | 46.92 |
| full rise (sec) | 61.46 |
| initial full rise (mm) | 409.68 |
| final full rise (mm) | 348.19 |

COMPARATIVE EXAMPLE 18

The control catalysts, 0.35 pphp DABCO 33LV catalyst and 0.24 pphp BL22 catalyst, and 2.9 pphp water (3.2 pphp total water) were added to master batch formulation I and allowed to age for 15h, then mixed well for 30 sec immediately prior to adding 41.6 pphp of an 80:20 mixture of 2,4- and 2,6-TDI (1.05 molar ratio of isocyanate to active hydrogen functionality). After mixing well for an additional 4 sec, the foam was allowed to rise freely at room temperature. Full foam rise height was easured immediately and again after aging for 24h.

| | |
|---|---|
| top of cup 1 (sec) | 9.68 |
| top of cup 2 (sec) | 26.29 |
| string gel (sec) | 44.79 |
| full rise (sec) | 59.05 |
| initial full rise (mm) | 409.14 |
| final full rise (mm) | 367.54 |

EXAMPLE 19

An experimental catalyst, 0.81 pphp of a 50 wt % aqueous solution of 1:2 BL22 catalyst and boric acid prepared according to Example 1 (equivalent to 0.24 pphp BL22 catalyst), 0.35 pphp DABCO 33LV catalyst, and 2.5 pphp water (3.2 pphp total water) were added to master batch formulation I and allowed to age for 15h, then mixed well for 30 sec immediately prior to adding 41.6 ppph of an 80:20 mixture of 2,4- and 2,6-TDI (1.05 molar ratio of isocyanate to active hydrogen functionality). After mixing well for an additional 4 sec, the foam was allowed to rise freely at room temperature. Full foam rise height was measured immediately and again after aging for 24h.

| | |
|---|---|
| top of cup 1 (sec) | 10.89 |
| top of cup 2 (sec) | 28.00 |
| string gel (sec) | 47.64 |
| full rise (sec) | 59.94 |
| initial full rise (mm) | 412.86 |
| final full rise (mm) | 356.48 |

EXAMPLE 20

An experimental catalyst, 0.98 pphp of a 50 wt % aqueous solution of 1:3 BL22 catalyst and boric acid prepared according to Example 2 (equivalent to 0.24 pphp BL22 catalyst), 0.35 pphp DABCO 33LV catalyst, and 2.4 pphp water (3.2 pphp total water) were added to master batch formulation I and allowed to age for 15h, then mixed well for 30 sec immediately prior to adding 41.6 pphp of an 80:20 mixture of 2,4- and 2,6-TDI (1.05 molar ratio of isocyanate to active hydrogen functionality). After mixing well for 4 sec, the foam was allowed to rise freely at room temperature. Full foam rise height was measured immediately and again after aging for 24h.

| | |
|---|---|
| top of cup 1 (sec) | 11.93 |
| top of cup 2 (sec) | 30.19 |
| string gel (sec) | 52.20 |
| full rise (sec) | 63.47 |
| initial full rise (mm) | 411.90 |
| final full rise (mm) | 356.37 |

COMPARATIVE EXAMPLE 21

The control catalysts, 0.35 pphp DABCO 33LV catalyst and 0.24 pphp BL22 catalyst, and 2.9 pphp water (3.2 pphp total water) were added to master batch formulation I and allowed to age for 15h, then mixed well for 30 sec immediately prior to adding 41.6 pphp of an 80:20 mixture of 2,4- and 2,6-TDI (1.05 molar ratio of isocyanate to active hydrogen functionality). After mixing well for 4 sec, the mixture was poured over 11 sec into a five vent mold heated to 140° F. (60° C.), and allowed to cure for 4 min prior to demold.

| | |
|---|---|
| extrusion (sec) | 27.21 |
| string gel (sec) | 36.26 |
| foam weight (g) | 180.2 |

EXAMPLE 22

An experimental catalyst, 0.81 pphp of a 50 wt% aqueous solution of 1:2 BL22 catalyst and boric acid prepared according to Example 1 (equivalent to 0.24 pphp BL22 catalyst), 0.35 pphp DABCO 33LV catalyst, and 2.5 pphp water (3.2 pphp total water) were added to master batch formulation I and allowed to age for 15h, then mixed well for 30 sec immediately prior to adding 41.6 pphp of an 80:20 mixture of 2,4- and 2,6-TDI (1.05 molar ratio of isocyanate to active hydrogen functionality). After mixing well for 4 sec, the mixture was poured over 11 sec into a five vent mold heated to 140° F. (60° C.), and allowed to cure for 4 min prior to demold.

| | |
|---|---|
| extrusion (sec) | 27.99 |
| string gel (sec) | 38.83 |
| foam weight (g) | 174.0 |

COMPARATIVE EXAMPLE 23

The control catalysts, 0.35 pphp DABCO 33LV catalyst and 0.15 pphp DABCO BL-11 catalyst, and 2.9 pphp water (3.2 pphp total water) were added to master batch formulation II and mixed well for 30 sec prior to adding 42.0 pphp of an 80:20 mixture of 2,4- and 2,6-TDI (1.05 molar ratio of isocyanate to active hydrogen functionality). After mixing well for 4 sec, the mixture was poured over 11 sec into a five vent mold heated to 140° F. (60° C.), and allowed to cure for 4 min prior to demold.

| | |
|---|---|
| extrustion (sec) | 34.75 |
| string gel (sec) | 44.17 |
| foam weight (g) | 189.6 |
| residual weight (g)* | 46.4 |
| extrusion weight (g) | 28.0 |

*weight of foam remaining in the cup after pouring into the mold

EXAMPLE 24

As experimental catalyst, 0.59 pphp of a 20 wt % solution of 1:2 TEDA and phenylboronic acid in a diethylene glycol/ethylene glycol mixture prepared according to Example 3, 0.25 pphp DABCO 33LV catalyst, 0.15 pphp DABCO BL-II catalyst, and 2.0 pphp water (3.2 pphp total water) were added to master batch formulation II and mixed well for 30 sec prior to adding 42.9 pphp of an 80:20 mixture of 2,4- and 2,6-TDI (1.05 molar ratio of isocyanate to active hydrogen functionality). After mixing well for 4 sec, the mixture was poured over 11 sec into a five vent mold heated to 140° F. (60° C.), and allowed to cure for 4 min prior to demold.

| | |
|---|---|
| extrustion (sec) | 39.63 |
| string gel (sec) | 49.43 |
| foam weight (g) | 188.4 |
| residual weight (g)* | 45.2 |
| extrusion weight (g) | 32.5 |

*weight of foam remaining in the cup after pouring into the mold

Solutions of tertiary amines and the boron compounds $R_nB(OR')_{3-n}$ can have much lower viscosity at comparable solids than previously reported amine-boron catalyst compositions. Low viscosity compositions are conveniently handled, whereas highly viscous materials often need to be heated to enable delivery into a commercial formulation.

COMPARATIVE EXAMPLE 25

The glycerol borate acid salt of TEDA was prepared according to U.S. Pat. No. 3,113,515. Boric acid was combined with 2 molar equivalents of glycerol and tested to 180° F. to afford a glycerol borate acid. The reaction mixture was then cooled to 100° F. and treated with 1 molar equivalent of TEDA. Further cooling afforded a viscous material containing 30 wt % TEDA which had a measured Brookfield viscosity of 14,800 centipoise at 25° C.

EXAMPLE 26

An aqueous 1:1 TEDA/boric acid molar mixture was prepared by dissolving TEDA in water and adding 1 molar equivalent of boric acid under ambient conditions. Dissolution of the boric acid was rapid, resulting in a modest exotherm (<50° C.). The resulting solution which was 33 wt % TEDA and 50 wt % solids had a measured Brookfield viscosity of 16 centipoise at 25° C.

Catalyst compositions of this invention have also been found to be non-corrosive according to a standard static NACE corrosivity test. Comparable strong acid blocked tertiary amine catalysts exhibit variable, however, typically significant, corrosion of carbon steel.

EXAMPLE 27

A series of tertiary amine/boric acid compositions was evaluated for corrosivity according to a standard static NACE corrosivity test. Coupons prepared from 1010 carbon steel were partially submerged in the catalyst solution. Corrosion as measured for the liquid and vapor phase contact as well as at the liquid/vapor interface. Comparative data was obtained for several commercially available acid blocked tertiary amine catalysts. The following Table C summarizes the results.

TABLE C

| | Catalyst Corrosivity | |
|---|---|---|
| Catalyst | Environment | Corrosion Rate |
| TEDA/H$_3$BO$_3$[a] | liquid | <0.10 mils/yr |
| TEDA/H$_3$BO$_3$ | liquid | 0.11 mils/yr |
| TEDA/H$_3$BO$_3$ | liquid/vapor | — |
| TEDA/H$_3$BO$_3$ | vapor | <0.10 mils/yr |
| TEDA/H$_3$BO$_3$ | vapor | <0.10 mils/yr |
| DABCO 8154[b] | liquid | 12.2 mils/yr |
| DABCO 8154 | liquid | 10.9 mils/yr |
| DABCO 8154 | liquid/vapor | — |
| DABCO 8154 | vapor | <0.10 mils/yr |
| DABCO 8154 | vapor | <0.10 mils/yr |
| BL-22/H$_2$BO$_3$[c] | liquid | <0.10 mils/yr |
| BL-22/H$_2$BO$_3$ | liquid | |
| BL-22/H$_2$BO$_3$ | liquid/vapor | — |
| BL-22/H$_2$BO$_3$ | vapor | <0.10 mils/yr |
| BL-22/H$_2$BO$_3$ | vapor | |
| DABCO BL-17[d] | liquid | 4 mils/yr |
| DABCO BL-17 | liquid | |
| DABCO BL-17 | liquid/vapor | significant corrosion visible etching at interface ($\approx$1/16-⅛ deep) |
| DABCO BL-17 | vapor | <0.10 mils/yr |

TABLE C-continued

| | Catalyst Corrosivity | |
|---|---|---|
| Catalyst | Environment | Corrosion Rate |
| DABCO BL-17 | vapor | |

[a]Example 4 catalyst
[b]Acid blocked catalyst
[c]Example 1 catalyst
[d]Acid blocked catalyst We have also found that these reduced odor tertiary amine/boron catalyst compositions provide physical property improvements. The glycerol borate acid/TEDA composition described in U.S. Pat. No. 3,113,515 afforded significant foam shrinkage in uncrushed molded foams. We have found that TEDA/boric acid compositions in water do not cause such shrinkage in five vent, hand-mixed molded foams.

COMPARATIVE EXAMPLE 28

The control catalyst, 1.0 pphp DABCO 33LV catalyst and 2.8 pphp water (3.2 pphp total water) were added to master batch formulation II. Foams were made over 8 days by combining this formulation with 43.09 pphp of an 80:20 mixture of 2,4- and 2,6-TDI (1.05 molar ratio of isocyanate to active hydrogen functionality), mixing well for 4 sec, pouring over 11 sec into a five vent mold heated to 140° F. (60° C.), and allowing to cure for 4 min prior to demold. Foams were removed from the mold without crushing and allowed to age at least 24h before physical properties were measured. Foam shrinkage was evaluated by measuring the molded foam thickness at its minimum and comparing to the actual mold depth (114 mm).

| | |
|---|---|
| extrusion (sec) | 32.1 (av) |
| string gel (sec) | 39.6 (av) |
| foam weight (g) | 197.0 (av) |
| foam thickness (mm) | 107 (av) |
| foam shrinkage (%) | 6 (av) |

COMPARATIVE EXAMPLE 29

A comparative catalyst, 1.10 pphp of TEDA/glycerol borate acid prepared according to Comparative Example 25 (containing 30 wt % TEDA), and 2.8 pphp water (3.2 pphp total water) were added to master batch formulation II. Foams were made over 8 days by combining this formulation with 43.79 pphp of an 80:20 mixture of 2,4- and 2,6-TDI (1.05 molar ratio of isocyanate to active hydrogen functionality), mixing well for 4 sec, pouring over 11 sec into a five vent mold heated to 140° F. (60° C.), and allowing to cure for 4 min prior to demold. Foams were removed from the mold without crushing and allowed to age at least 24h before physical properties were measured. Foam shrinkage was evaluated by measuring the molded foam thickness at its minimum and comparing to the actual mold depth (114 mm).

| | |
|---|---|
| extrusion (sec) | 34.3 (av) |
| string gel (sec) | 43.4 (av) |
| foam weight (g) | 191.6 (av) |
| foam thickness (mm) | 98 (av) |
| foam shrinkage (%) | 14 (av) |

EXAMPLE 30

An experimental catalyst, 1.00 pphp of a 50 wt % aqueous solution of 1:1 TEDA/boric acid (containing 33 wt % TEDA) from Example 26, and 2.3 pphp water (3.2 pphp total water) were added to master batch formulation II. Foams were made over 8 days by combining this formulation with 42.18 pphp of an 80:20 mixture of 2,4- and 2,6-TDI (1.05 molar ratio of isocyanate to active hydrogen functionality), mixing well for 4 sec, pouring over 11 sec into a five vent mold heated to 140° F. (60° C.), and allowing to cure for 4 min prior to demold. Foams were removed from the mold without crushing and allowed to age at least 24h before physical properties were measured. Foam shrinkage was evaluated by measuring the molded foam thickness at its minimum and comparing to the actual mold depth (114 mm).

| | |
|---|---|
| extrusion (sec) | 31.6 (av) |
| string gel (sec) | 39.4 (av) |
| foam weight (g) | 192.3 (av) |
| foam thickness (mm) | 111 (av) |
| foam shrinkage (%) | 2.6 (av) |

These new catalyst compositions also have significan reduced amine odor compared to standard catalyst compositions containing volatile tertiary amines. We suspect that the presence of the boron compound in the catalyst solution minimizes release of amine into the atmosphere.

EXAMPLE 31

A 1:1 molar mixture of 3-quinuclidinol (3-QND) and boric acid was prepared by dissolving 3-QND (15 g) in water (22.3 g) at room temperature. The boric acid (7.4 g) was added and dissolved to give a clear, pale yellow solution. The resulting solution was 33 wt % 3-QND.

COMPARATIVE EXAMPLES 32 and 34 AND EXAMPLES 33 and 35

PHD polyol based formulations were prepared from the master batch formulation, water (adjusted in each case to keep the total water level equal to 3.2 pphp) and varying combinations of 3-QND, N,N,N'-trimethyl-N-hydroxyethylbis(aminoethyl)ether (Texacat®ZF-10) and an experimental catalyst prepared according to Example 31. The formulations were mixed well for 30 sec prior to adding 42 pphp of an 80:20 mixture of 2,4- and 2,6-TDI (1.05 molar ratio of isocyanate to active hydrogen functionality). After mixing well for 4 sec, the mixtures were poured over 11 sec into a five vent mold heated to 140° F. (60° C.) and allowed to cure for 4 min prior to demold. The following Table D summarizes the results.

TABLE D

| | Comp Ex 32 3-QND[a] | Ex 33 Ex 31 cat | Comp Ex. 34 3-QND[b]/ ZF-10 | Ex 35 Ex 31 cat/ ZF-10 |
|---|---|---|---|---|
| Catalyst (pphp) | 0.9 | 0.9 | 0.41/0.23 | 0.61/0.12 |
| Contained amine (pphp) | 0.3 | 0.3 | 0.43 | 0.32 |
| Extrusion (sec) | 46.0 | 30.1 | 35.1 | 33.1 |
| String Gel (sec) | 55.6 | 38.5 | 43.6 | 45.0 |
| Foam Weight | 199.8 | 188.4 | 196.9 | 186.2 |

TABLE D-continued

| | Comp Ex 32 3-QND[a] | Ex 33 Ex 31 cat | Comp Ex. 34 3-QND[b]/ ZF-10 | Ex 35 Ex 31 cat/ ZF-10 |
|---|---|---|---|---|
| (g) | | | | |

[a] delivered as a 33 wt % solution in ethylene glycol
[b] delivered as a 50 wt % solution in water Comparative Example 32 and Example 33 show that at an equimolar amine level, the addition of boric acid dramatically reduces extrusion and gel times for the foaming process. Comparative Example 34 and Example 35 show that equivalent reactivity during the foaming process can be achieved at lower amine use level in the presence of boric acid.

EXAMPLE 36

Gas chromatoqraphy head space analysis was performed to determine amine content in the atmosphere above various catalyst solutions. A five gram aliquot of each sample was weighed into headspace vials and kept at a constant 30° C. for at least one hour before being analyzed. A 1-cc aliquot of the headspace was injected onto an HP-5 capillary column interfaced to a flame ionization detector. Quantitation was obtained using an external standard procedure. The amine/boron catalyst solutions were compared to commercial catalyst compositions such as DABCO 33-LV and DABCO BL-11 catalysts. The data in Table E shows a lower amine concentration in the head space over the compositions of the invention than over the commercial catalysts.

TABLE E

| Catalyst | Amine concentration in head space |
|---|---|
| New catalyst compositions: | |
| Example 1 catalyst | 2.2 mol ppm |
| Example 4 catalyst | 1.8 mol ppm |
| Example 5 catalyst | 2.4 mol ppm |

TABLE E-continued

| Catalyst | Amine concentration in head space |
|---|---|
| Example 6 catalyst | 3.6 mol ppm |
| Commercial Catalysts: | |
| DABCO 33-LV | 145.9 mol ppm |
| DABCO BL-11 | 114.1 mole ppm |

STATEMENT OF INDUSTRIAL APPLICATION

The present invention provides an amine catalyst composition for making polyurethane foam products which exhibits reduced odor, reduced viscosity and lower corrosivity.

We claim:

1. A catalyst composition consisting essentially of a hydroxyl group-containing tertiary amine urethane catalyst and a boron compound of the formula

$R_nB(OH)_{3-n}$ where
n = 0 or 1, and
R = $C_1$–$C_8$ alkyl, $C_5$–$C_8$ cycloalkyl or $C_6$–$C_{10}$ aryl.

2. The catalyst composition of claim 1 in which the tertiary amine is N,N,N'-trimethyl-N'-hydroxyethylethylene-diamine, N,N-dimethylethanolamine, N,N,N'-trimethyl-N,-hydroxy-ethylbis(aminoethyl)ether or 3-quinuclidinol.

3. The catalyst composition of claim 1 in which the tertiary amine is 3-quinuclidinol.

4. The catalyst composition of claim 1 in which the boron compound is boric acid, phenylboronic acid or isopropylboronic acid.

5. The catalyst composition of claim 1 in which the boron compound is boric acid.

6. The catalyst composition of claim 3 in which the boron compound is boric acid.

7. The catalyst composition of claim 1 in which the tertiary nitrogen to boron is a 1:0.1 to 1:10 molar ratio.

8. The catalyst composition of claim 1 in which the tertiary nitrogen to boron is a 1:0.5 to 1:2 molar ratio.

* * * * *

UNITED STATES PATENT AND TRADEMARK OFFICE
CERTIFICATE OF CORRECTION

PATENT NO. : 5,238,894

DATED : 24 August 1993

INVENTOR(S) : Ann C. L. Savoca, Michael Louie, Mark L. Listemann

It is certified that error appears in the above-identified patent and that said Letters Patent is hereby corrected as shown below:

Column 16, line 30, delete--"15--.

Signed and Sealed this

Seventeenth Day of May, 1994

Attest:

BRUCE LEHMAN

*Attesting Officer*     *Commissioner of Patents and Trademarks*